United States Patent [19]
Brandt et al.

[11] Patent Number: 5,456,333
[45] Date of Patent: Oct. 10, 1995

[54] ELECTROHYDRAULIC CONTROL DEVICE FOR A DRIVE TRAIN OF A VEHICLE

[75] Inventors: Chris D. Brandt, Peoria; Michael F. Coffman, Metamora; Randall M. Mitchell, Washington, all of Ill.

[73] Assignee: Caterpillar Inc., Peoria, Ill.

[21] Appl. No.: 37,045

[22] Filed: Mar. 25, 1993

[51] Int. Cl.$^6$ .................................................. B60K 23/02
[52] U.S. Cl. ...................... 180/336; 192/3.29; 192/3.58; 192/13 R
[58] Field of Search ...................................... 180/315, 336; 74/890; 192/3.26, 3.25, 3.29, 3.58, 13 R, 3.57, 0.09

[56] References Cited

U.S. PATENT DOCUMENTS

| | | | |
|---|---|---|---|
| 5,040,648 | 8/1991 | Mitchell et al. | 192/3.58 |
| 5,042,314 | 8/1991 | Rytter et al. | 180/336 |

FOREIGN PATENT DOCUMENTS

| | | | |
|---|---|---|---|
| 0475918 | 3/1992 | European Pat. Off. | F16H 61/02 |
| 1156658 | 10/1963 | Germany | 192/3.57 |
| 4-145254 | 5/1992 | Japan | 74/890 |

*Primary Examiner*—Eric D. Culbreth
*Attorney, Agent, or Firm*—James R. Yee

[57] ABSTRACT

An electrohydraulic control device for a drive train of a vehicle including an engine, a transmission, a source of pressurized fluid, and an input clutch driving connected between the engine and the transmission. The device includes a control lever or handle having a control member progressively manually movable between first and second positions, wherein the transmission is adapted to responsibly shift between a FORWARD and a REVERSE gear ratio in response to movement of the control member from the first position to the second position. An electronic control module is adapted to determine a transmission clutch relative speed as a function of the transmission output speed and the transmission input speed and responsively engage and disengage the input clutch during a directional shift.

17 Claims, 10 Drawing Sheets

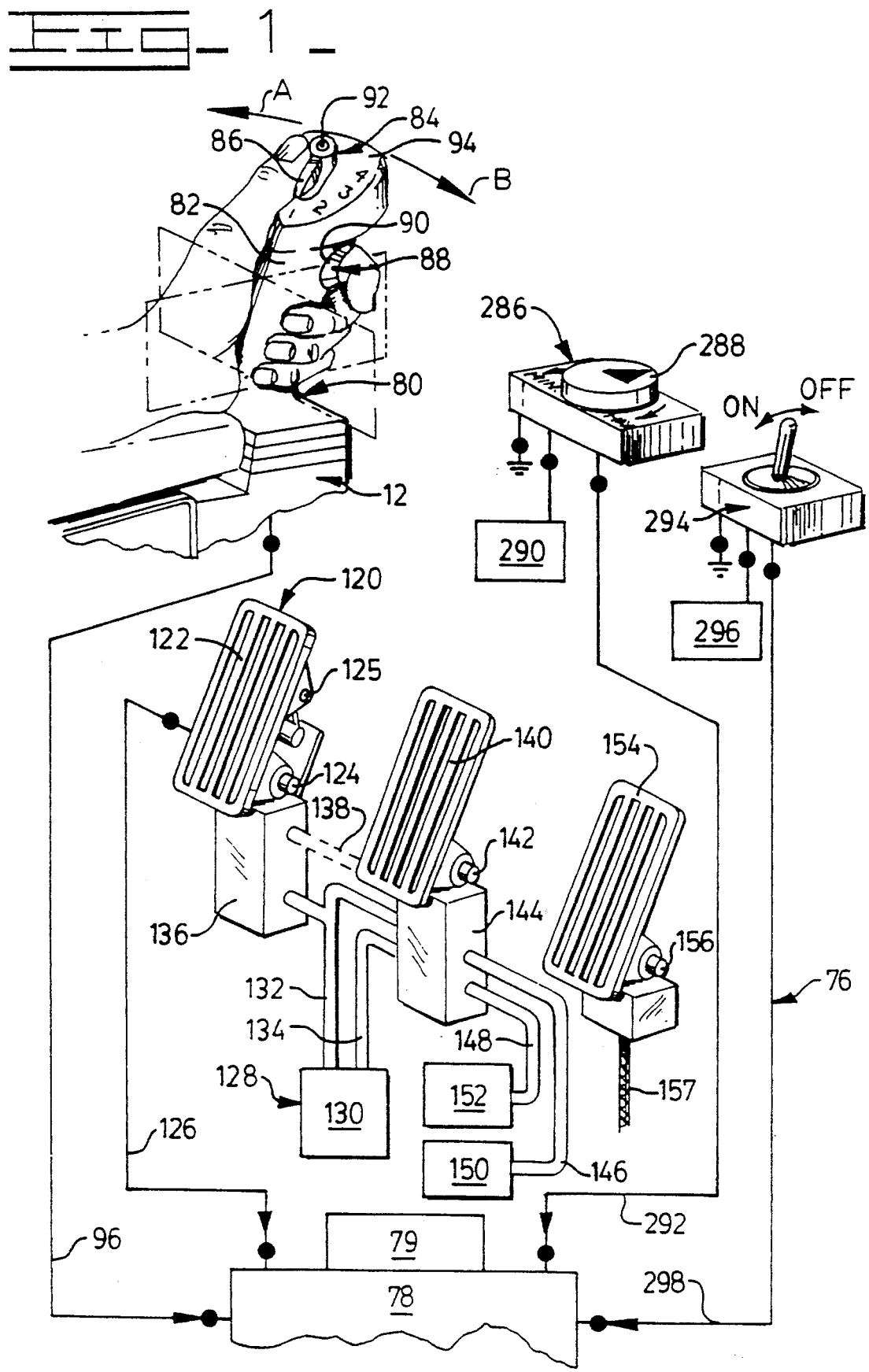

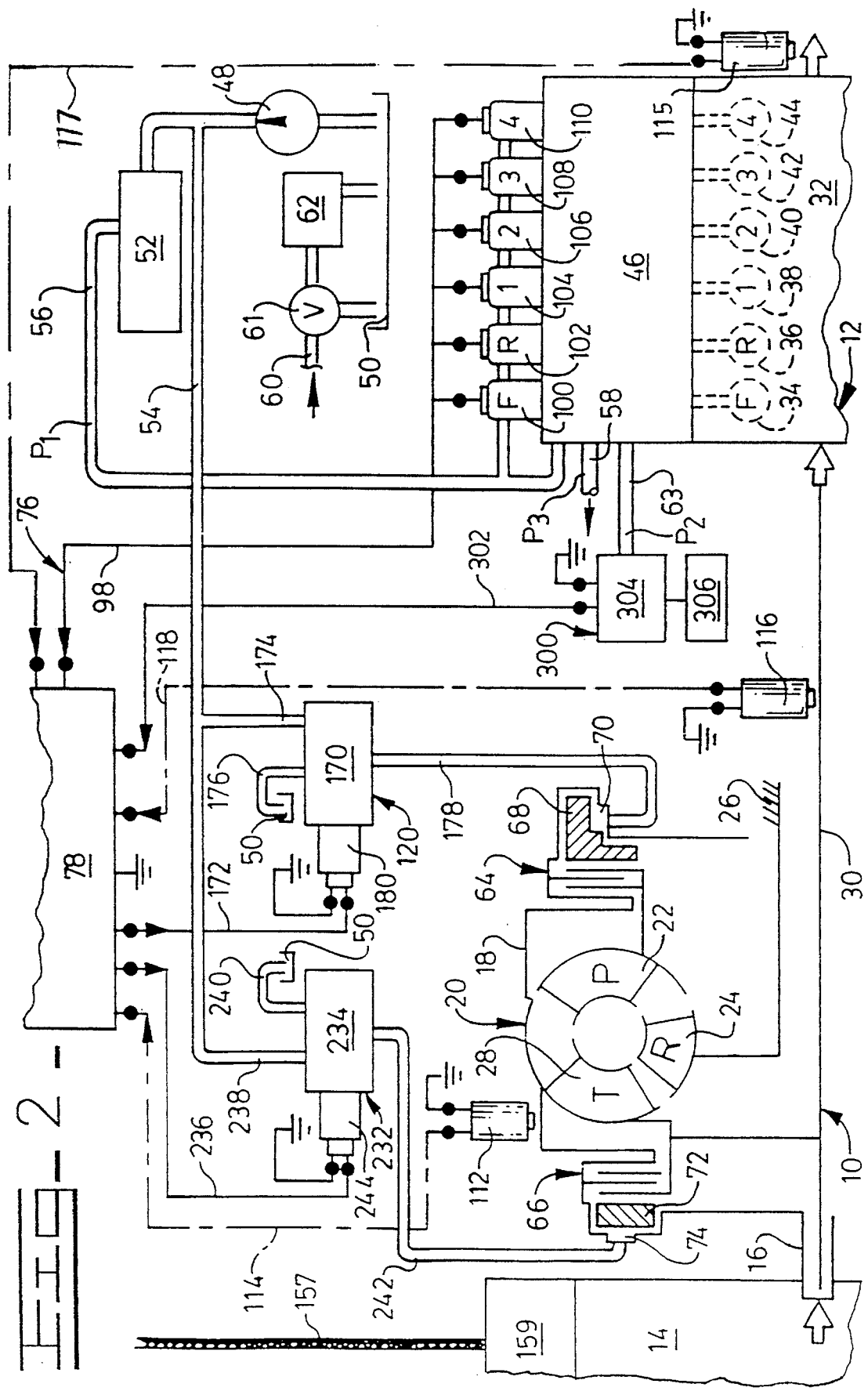

FIG_3
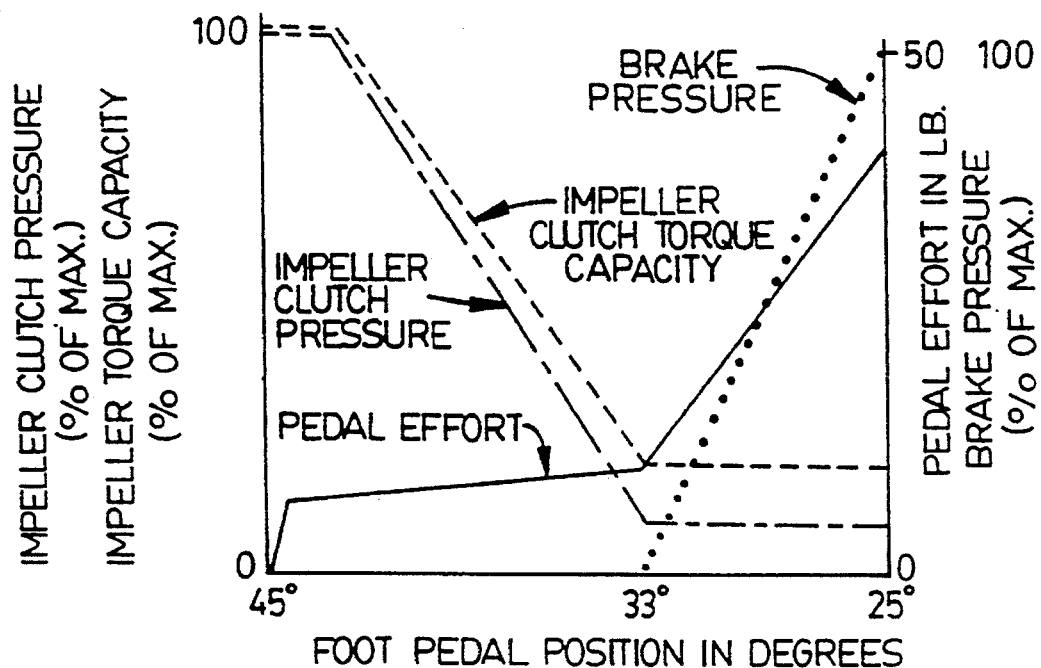
FIG_4
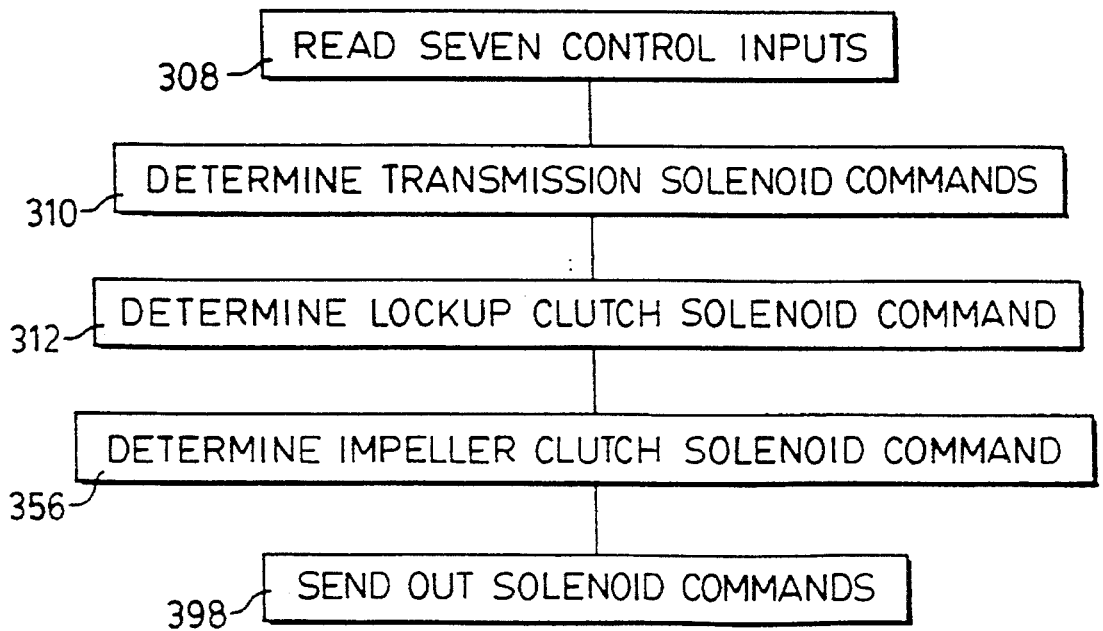

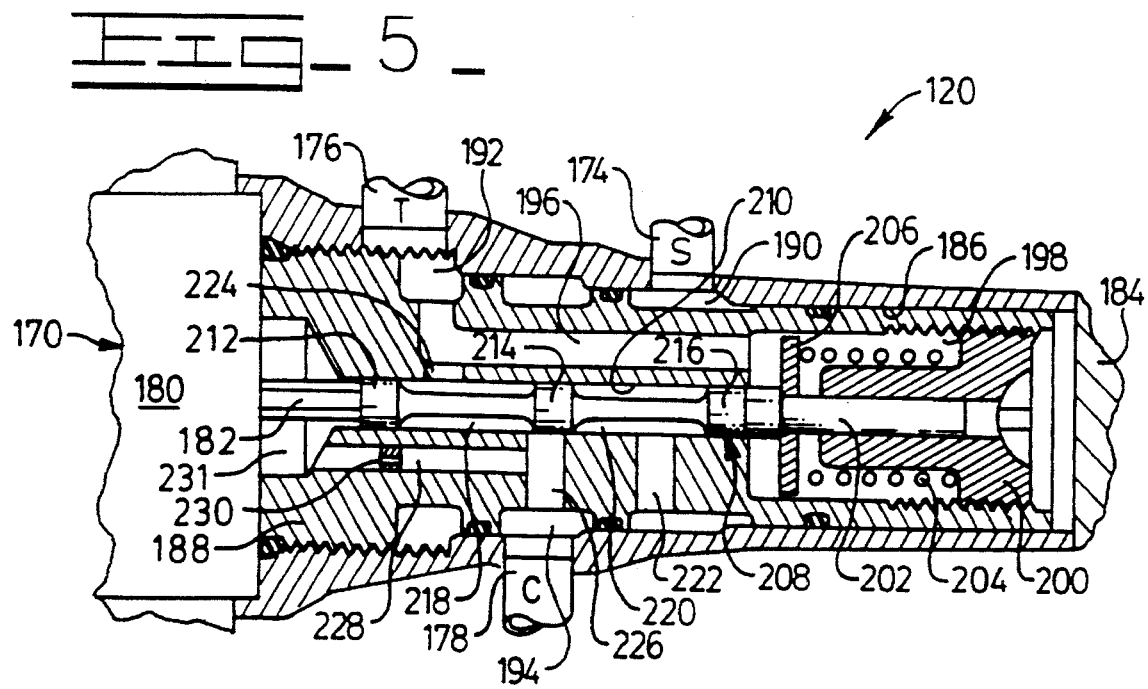
FIG_5_
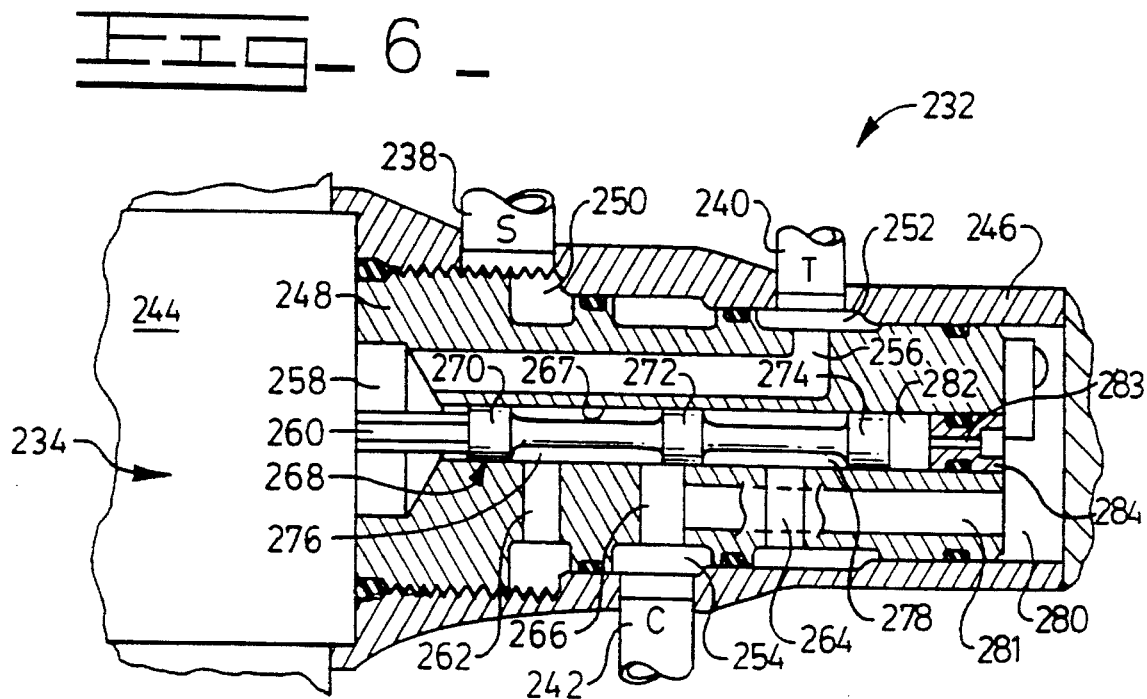
FIG_6_

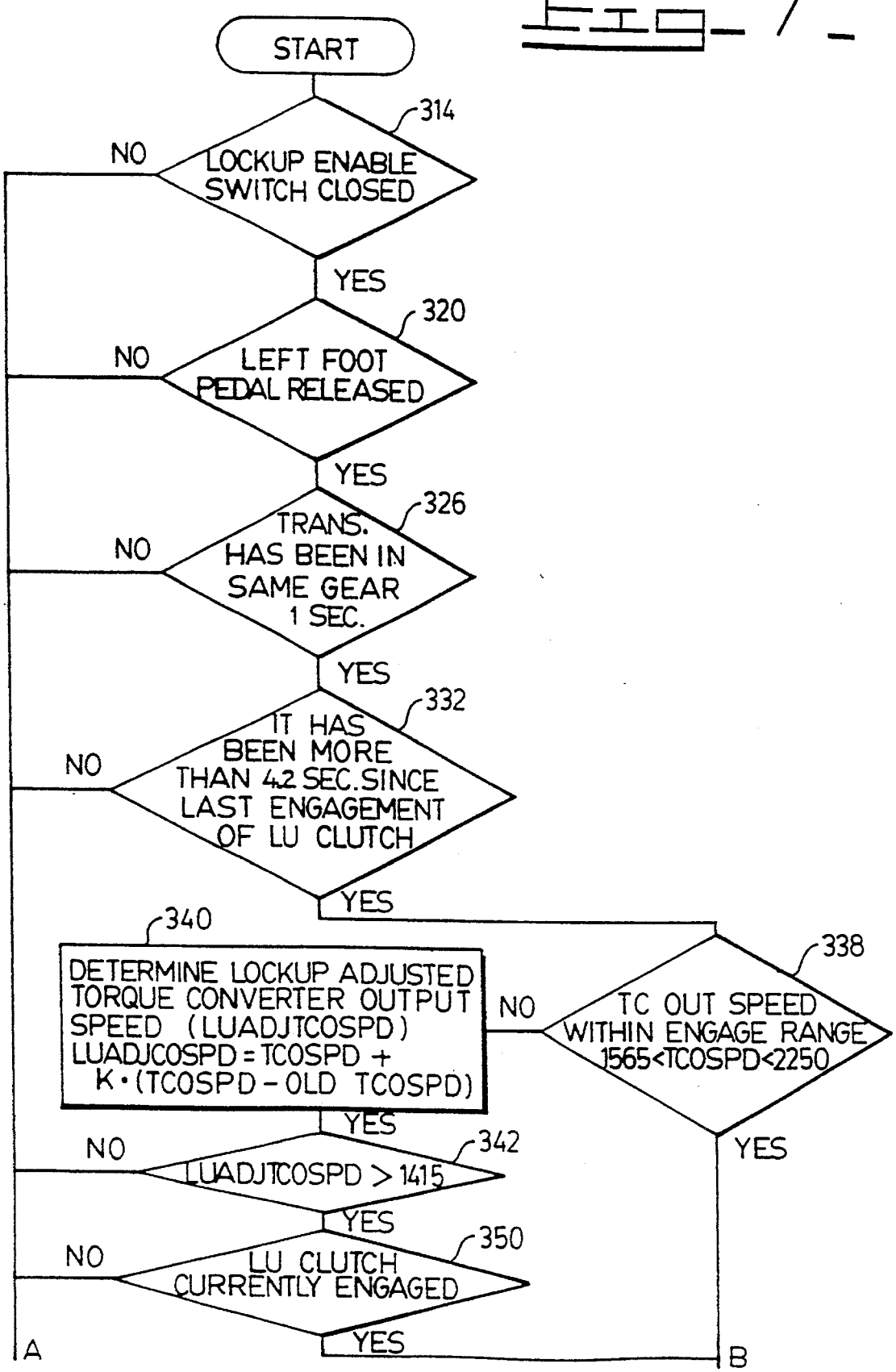
FIG_7

FIG. 9
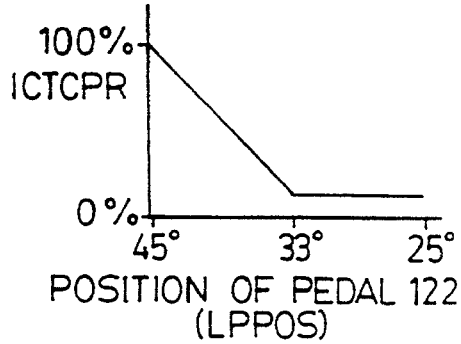
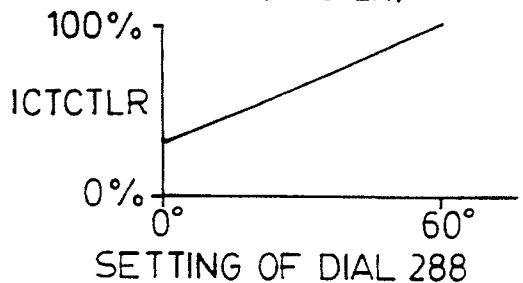
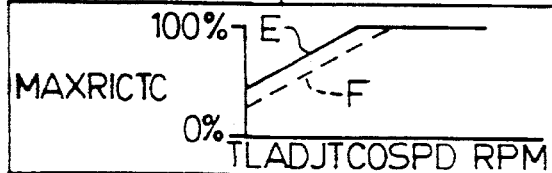

Fig_10_

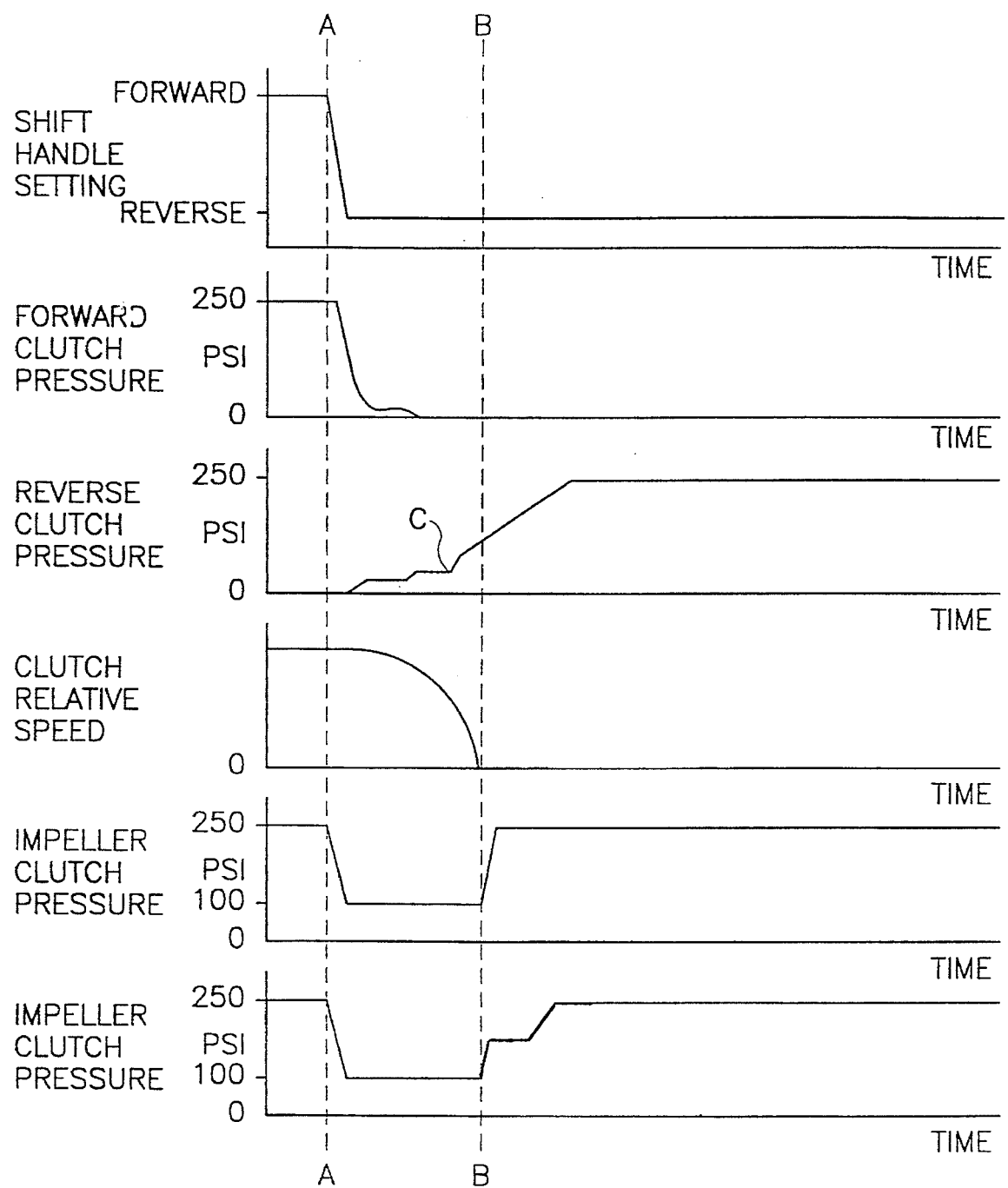

ELECTROHYDRAULIC CONTROL DEVICE FOR A DRIVE TRAIN OF A VEHICLE

TECHNICAL FIELD

The present invention relates generally to an electrohydraulic control device and method for controllably operating a vehicle, and more particularly to an electrohydraulic control device having an electronic control module and one or more manually operated actuator mechanisms for affecting certain modes of operation of the drive line of the vehicle through the electronic control module including the engagement of a torque converter input clutch.

BACKGROUND ART

In one conventional mode of "inching" of a vehicle the transmission is kept in gear and the brakes are manually modulated by use of a foot pedal. This is undesirable because it requires considerable operator effort and because the service brakes experience a relatively rapid rate of wear. In another well known mode, when the vehicle's service brakes are applied by the depression of a foot pedal an associated disc and plate type transmission clutch is caused to slip so that the transmission is substantially neutralized. This is most often accomplished by the brake system fluid circuit acting upon an "inching" valve disposed between a pressure source and the clutch, as has been widely used in shuttle-type lift trucks. This is desirable since the vehicle's ground speed is reduced for more precise control, while the speed of the engine is maintained at a relatively high rate to enable a rapid response of the auxiliary equipment operated by the engine. However, controlled slip at a fixed setting of the manually operated control member in both of these modes of operation has heretofore been impractical.

The interconnection between the service brake pedal and a clutch pedal can be done mechanically, but this requires rather critical adjustments to function properly U.S. Pat. No. 2,972,906 issued to C. S. Schroeder on Feb. 28, 1961, for example, discloses a left foot pedal that mechanically operates a spool of a valve for decreasing the pressure delivered to a clutch in order to controllably slip it. A right foot pedal is independently depressible to solely engage the service brakes, and the left foot pedal is mechanically connected to the right foot pedal after some free travel of the left foot pedal to depress it and to cause the application of the service brakes after some clutch slippage.

U.S. Pat. No. 3,181,667 issued to K. R. Lohbauer et al. on May 4, 1965 is illustrative of another double pedal system for automatically neutralizing a vehicle's transmission with the application of the service brakes. Depression of the right brake pedal causes application of the service brakes, whereas depression of the left brake pedal causes actuation of a transmission neutralizing valve associated with the transmission to disengage it while simultaneously cooperating with a cross shaft arrangement to physically move the right brake pedal and cause the brakes to be applied after a certain amount of free travel.

At the same time, hydrodynamic torque converters having bladed impeller, reactor and turbine elements have been widely incorporated in vehicles between the engine and a multispeed transmission. U.S. Pat. No. 3,820,417 issued to T. E. Allen et al. on Jun. 28, 1974 illustrates a more sophisticated variation thereof wherein a disc type input clutch is disposed within the rotating housing of the torque converter to controllably deliver power from the engine to the impeller element. That patent further discloses a disc type lockup clutch engageable at a relatively high torque converter output speed for directly mechanically connecting the input rotating housing and the turbine element and obtaining an improved efficiency of the drive train. To effectively absorb the energy peaks resulting from the release and engagement of the downstream clutches of the transmission, the converter input clutch in U.S. Pat. No. 3,820,417 is disengaged during each gear shift and controllably reengaged after certain selected ones of the transmission clutches were engaged. The design of the transmission clutches could thus be simplified because they would not be required to absorb the full energy levels of the Shift. On the other hand, the control system associated with the actuating pistons of the input clutch and the lockup clutch was solely of the hydraulic valving type and not fully responsive to the full range of operating conditions of a vehicle.

U.S. Pat. No. 3,680,398 issued to R. C. Schneider et al. on Aug. 1, 1972 illustrates another torque converter with a hydraulically modulated or slippable input clutch which has a hydraulic control valve mechanism for preventing the impeller element from being driven in a reverse direction during shifts of the transmission under certain conditions of movement of the vehicle. Specifically, a preselected minimum pressure level is directed to the actuating piston of that input clutch to prevent the impeller from reversing direction and to thus reduce the power level transmitted through it. A radially oriented valve spool within the impeller element is sensitive to the speed of rotation thereof, and substantial efforts are made to control the dumping and filling of the input clutch with respect to the transmission clutches during different shifting conditions.

U.S. Pat. No. 3,822,771 issued to S. A. Audiffred et al. on Jul. 9, 1974 discloses another hydraulic control system for a torque converter of the type described that has a dual purpose option. For example, the operator of a wheel loader can adjust the controls to apportion the power delivery to the wheels and to auxiliary equipment to better match the work tasks being undertaken. More particularly, a right foot pedal could be manually depressed to controllably increase the pressure level to the actuating piston of the converter input clutch and to deliver more torque to the wheels. A knob on the dash could be adjusted by the operator to set a limit to the amount of torque being delivered to the wheels and to minimize the amount of tire slippage. Another knob could be adjusted to change over the control system so that the depression of the same right foot pedal would cause solely the acceleration of the engine with a fully engaged converter input clutch. In that control system a left foot pedal solely engaged the service brakes, and a central foot pedal sequentially engaged the service brakes and neutralized the transmission.

U.S. Pat. No. 3,621,955 issued to J. B. Black on Nov. 23, 1971 is illustrative of torque delivered through the converter input clutch to the wheels. For example, when a wheel loader is forcing a bucket forwardly into a pile of earth the input clutch could be controllably slipped below a preselected output speed of the torque converter in order to minimize tire slippage and to thus reduce the amount of tire wear.

The aforementioned torque converter equipped drive trains have not been fully commercially exploited because the control systems used therewith have become too complex in an attempt to accomplish all of the tasks required to controllably shift the converter input clutch, the lockup clutch, and the speed and directional clutches of the transmission in the desired manner. Moreover, many of these systems have not been sufficiently adjustable to make the systems practical to matching a wide range of vehicular operating conditions.

The broad adaptation of automated electronic-over-hydraulic transmission controls of the type shown by U.S. Pat. No. 4,208,925 issued Jun. 24, 1980 to R. G. Miller et al.; U.S. Pat. No. 4,414,863 issued Nov. 15, 1983 to D. L. Heino; U.S. Pat. No. 4,699,239 issued Oct. 13, 1987 to T. Ishino et al.; and U.S. Pat. No. 4,734,861 issued Mar. 29, 1988 to R. B. Berolasi et al., indicates that they have become fully accepted and even demanded by progressive vehicular operators. The electronic portion of these controls is capable of being programmed to accomplish a wide variety of logic steps relatively instantaneously after receiving the input signals from a plurality of signal generating devices. Thereafter, the electronic portion directs control signals to a plurality of solenoid-operated valves for directing fluid to the various clutches controlling the transmission gear ratios in a fully automated manner, in a fully manually selected manner, or in a combination of the two forms of control.

What is needed is an electrohydraulic control device for controllably operating an input clutch of a vehicular drive train that would incorporate a microprocessor-based electronic control module responsive to the manual movement of a control member by the vehicle operator. The subject electrohydraulic control device should electrically operate a valve and thereby precisely control the degree of engagement of the input clutch by supplying pressurized fluid thereto, and should contain logic routines for automatically overriding the manually called for degree of engagement under certain conditions of operation of the vehicle. Preferably, the drive train should include a torque converter with an impeller element driven by the input clutch, a turbine element, and a lockup clutch for mechanically bypassing the torque converter, and be especially adaptable for use in an earthmoving vehicle. In such instance the subject device should be responsive to the Speed of the engine, the output speed of the torque converter, and changes in the transmission gear selector to controllably manage the degree of engagement of the input clutch and the lockup clutch in accordance with preprogrammed logic and sequence steps. Specifically, it would be desirable to avoid excessive engine lug on the one hand to maintain the responsiveness of auxiliary equipment operated directly by the engine, and to avoid engine overspeeding on the other hand. Furthermore, the device should be integrated into a fully practical braking system for the vehicle, and be of a construction sufficient to fully overcome one or more of the problems associated with the prior art as set forth above. Moreover, the device should improve the overall productivity of the vehicle on which it is mounted, and preferably should reduce fuel consumption.

The present invention is directed at solving one or more of the problems as set forth above.

DISCLOSURE OF THE INVENTION

In one aspect of the present invention, an electrohydraulic control device for a drive train of a vehicle including an engine, a transmission, a source of pressurized fluid, and an input clutch connected between the engine and the transmission is provided. The device includes a control lever or handle having a control member progressively manually movable between first and second positions, wherein the transmission is adapted to responsibly shift between a FORWARD and a REVERSE gear ratio in response to movement of the control member from the first position to the second position. An electronic control module is adapted to determine transmission clutch relative speed as a function of the transmission output speed and the transmission input speed and responsively engage and disengage the input clutch during a directional shift.

BRIEF DESCRIPTION OF THE DRAWINGS

FIG. 1 is a diagrammatic and pictorial view of an upper portion of one embodiment of the electrohydraulic control device of the present invention that is separated from the lower remaining portion shown in FIG. 2;

FIG. 2 is a diagrammatic view of the lower remaining portion of the electrohydraulic control device showing a vehicle's drive train that is controlled by an electronic control module as illustrated in FIGS. 1 and 2;

FIG. 3 is a graph illustrating impeller clutch torque as a percentage of maximum, impeller clutch pressure as a percentage of maximum, left foot pedal effort, and brake pressure as a percentage of the maximum with the depression of the left foot pedal of the electrohydraulic control device;

FIG. 4 is a main program flow chart showing the major processing steps initiated by the electronic control module shown in FIGS. 1 and 2;

FIG. 5 is a longitudinal sectional view of the solenoid-operated impeller clutch valve shown in box outline form in FIG. 2;

FIG. 6 is a longitudinal sectional view of the solenoid-operated lockup clutch valve shown in FIG. 2;

FIGS. 7 and 8 are a first subsidiary program flow chart showing the processing steps initiated by the electronic control module in conjunction with determining the lockup clutch solenoid command;

FIGS. 9, 10 and 11 are a second subsidiary program flow chart showing the logic routines and processing steps initiated by the electronic control module of the present invention in conjunction with determining the impeller clutch solenoid command; and FIG. 12 is a diagrammatic representation of the shift control member setting, the forward and reverse clutch pressures, the reverse clutch relative speed, and the impeller clutch pressure as a function of time during a gear shift of a transmission associated with the electrohydraulic control device of the present invention.

BEST MODE FOR CARRYING OUT THE INVENTION

Figure 8:
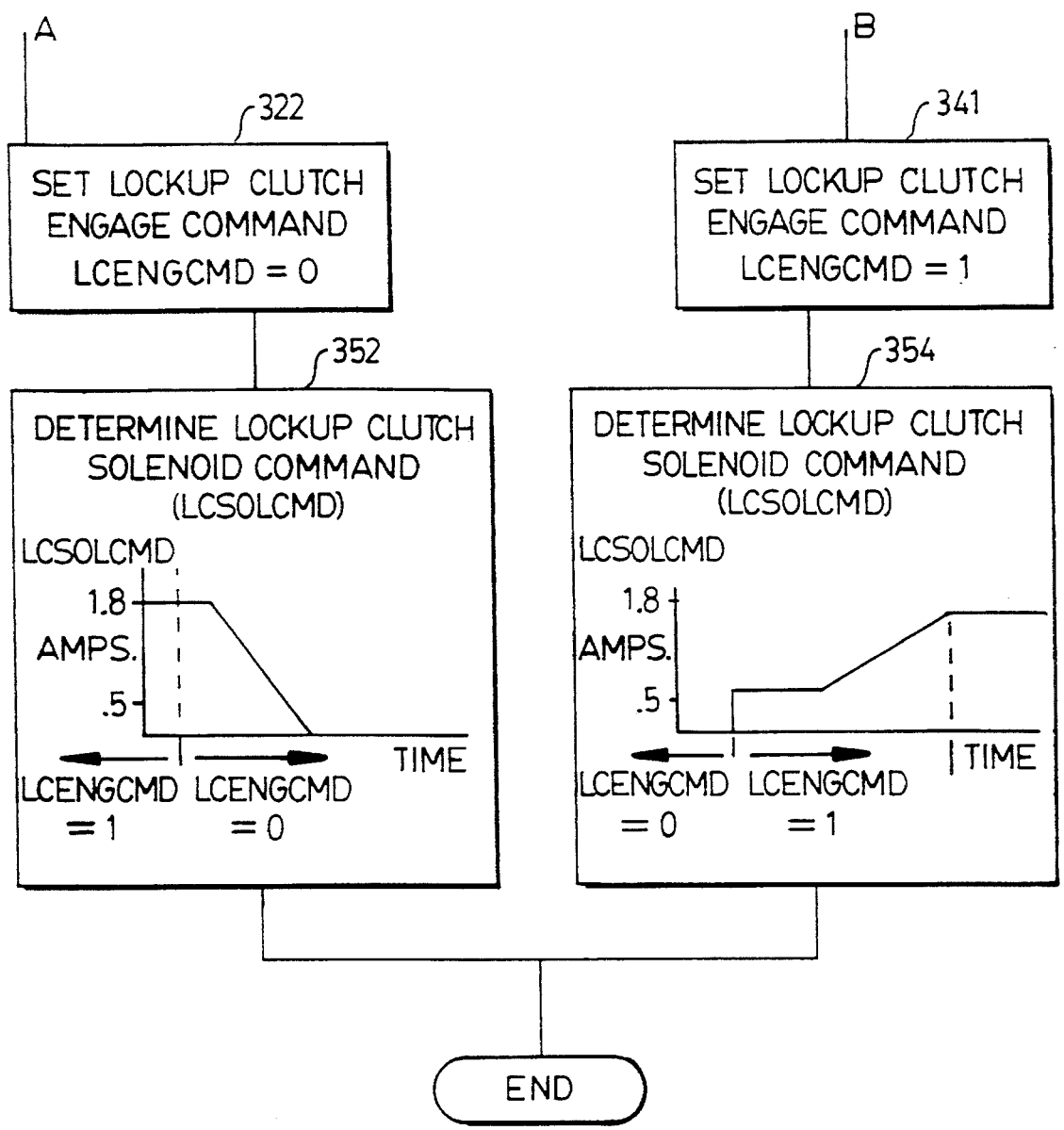

A drive train 10 for a vehicle 12 such as an earthmoving wheel loader or the like is illustrated in FIG. 2. The drive train includes an engine 14 having a shaft 16 connected to drive a housing 18 of a hydrodynamic torque converter 20. The torque converter has a pump (P) or impeller element 22, a reactor (R) or reactor element 24 connected to a stationary support member 26, and a turbine (T) or turbine element 28 connected to a centrally located output shaft 30. The portions located below the axis of the output shaft 30 have been omitted, since it is well known treat these bladed converter elements are annular. The output shaft 30 provides the input to a multispeed transmission 32 that preferably has a plurality of interconnected planetary gear sets, not shown, selectively engaged in cooperating groupings by operation of a pair of disc-type directional clutches or brakes 34 and 36, and a plurality of disc-type speed clutches or brakes 38, 40, 42 and 44 as is schematically indicated.

In the instant embodiment, four forward and four reverse speeds can be obtained with the actuation of a conventional hydraulically operated transmission control 46 having a plurality of pressure controlling valves therein, not shown, that are in selective communication with the clutches or brakes 34,36,38,40, 42 and 44. A charging pump 48 is effective to direct fluid from a tank or reservoir 50 to a conventional priority valve 52 which has a preselected pressure setting, for example 320 psi (2,200 kPa). Thus, a first conduit or pressure rail 54 branching off from the pump has top priority, and a second conduit or pressure rail 56 has secondary priority since the priority valve opens to allow pump flow thereto at that pressure. These two conduits are pressure sources that are normally maintained at approximately 370 psi (2,550 kPa), for example. During a shift of the transmission 32 the priority valve is adapted to close. The second conduit 56 is connected to the transmission control 46 and experiences pressure levels P1 corresponding to that of one of the speed clutches 38,40,42 and 44. The transmission control subsequently directs flow to the torque converter 20 through internal pressure reducing valving, not shown, to a charging conduit 58 at a lower pressure P3 for charging and lubrication purposes. The discharge or return flow from the torque converter is directed to an outlet conduit 60, an outlet relief valve 61 that maintains approximately 60 psi (410 kPa) in the outlet conduit, a cooler or heat exchanger 62, and back to the tank 50. Another conduit 63 within the transmission control 46 experiences pressure levels P2 corresponding to that of one of the directional clutches 34 and 36, and such levels are normally about 55 psi (380 kPa) below the pressure level P1 of the selected speed clutch.

The drive train also has a disc-type input clutch or impeller clutch 64 located between the engine 14 and the torque converter 20 for controllably coupling the rotating housing 18 to the pump element 22, and a disc-type lockup clutch 66 for selectively coupling the rotating housing to the turbine element 28 and the output shaft 30 for a direct mechanical connection that effectively bypasses the torque converter. The input clutch 64 includes an annular piston 68 subject to movement clampingly against the usual interleaved plates and discs by pressurizing an annular actuating chamber 70, and the lockup clutch 66 includes an annular piston 72 and an annular actuating chamber 74 for engagement purposes.

An electrohydraulic control device 76 is provided for operation of the drive train 10 as is shown in both FIGS. 1 and 2. The control device 76 includes an electronic control module 78 connected to an electrical power source 79 and containing an internal microprocessor, not shown. The term microprocessor is meant to include microcomputers, microprocessors, integrated circuits and the like capable of being programmed. The electronic control module 78 contains sufficient electronic circuitry to convert input signals from a plurality of sensors and switches to a form readable by the microprocessor, and circuitry to generate sufficient power to drive a plurality of solenoids for actuating the transmission 32, the impeller clutch 64, and the lockup clutch 66 according to the microprocessor output signals as will be described later. The microprocessor is programmed with preselected logic rules for receiving one or more manually selected operating signals and a plurality of automatically generated operating signals. The upper left portion of FIG. 1 illustrates first actuator means or a first actuator mechanism 80 for operating the transmission control 46 and changing the gear ratio and/or direction of the vehicle 12. Such actuator means includes an upstanding control handle 82 having speed selector means or a speed selector apparatus 84 including an actuating element 86 for changing the gear ratio of the vehicle 12, and directional selector means or a directional selector apparatus 88 including another actuating element 90 for changing the direction of longitudinal travel of the vehicle. More particularly, the actuating element 86 is movable by an operator's thumb about a pivot axis 92 to any one of four gear ratio positions as indicated by an indicia plate 94 on the control handle 82. A conventional rotary electrical switch, not illustrated within the control handle, directs electrical signals corresponding to these four gear ratio or speed positions through a wiring harness 96 to the electronic control module 78. Similarly, the operator's trigger finger can bias the rockable actuating element 90 to any one of three positions.

A three-way electrical switch (not shown) within the control handle, can direct electrical signals through the same wiring harness 96 to the electronic control module 78 corresponding to the FORWARD, NEUTRAL and REVERSE modes of operation of the transmission control 46.

As shown in FIG. 2, another wiring harness 98 extends from the electronic control module 78 to six pilot operating solenoid valves 100, 102, 104, 106, 108 and 110 corresponding to FORWARD, REVERSE, and FIRST, SECOND, THIRD and FOURTH gear ratios respectively, and hereinafter referred to as transmission solenoids. While the wiring harness 98 is shown diagrammatically, it is to be appreciated that each of these transmission solenoids is preferably connected to the electronic control module by two wires including a positive lead and a grounded lead for subsequently piloting the internal valving within the transmission control 46. These six transmission solenoid valves are individually connected to the fluid pressure existing in the second conduit 56.

Alternatively, the FORWARD and REVERSE solenoid clutches may be mechanically actuatable through a conventional lever arm and control valves.

The electronic control module 78 automatically receives three control signals. As shown in FIG. 2, an engine speed sensor 112 is mounted on a stationary portion of the drive train 10 for providing an electrical frequency signal in a signal line 114 proportionate to the rotational speed of the engine shaft 16 or the rotating housing 18 connected directly thereto. Another speed sensor 116 directs an electrical signal to the electronic control module via a signal line 118 corresponding to the rotational speed of the torque converter output shaft 30, and also the direction of rotation thereof which is carried by the pattern of the signal in a conventional manner. The speed of the torque converter output shaft is equal to the input speed of the transmission. A third speed sensor 115 directs an electrical signal to the electronic control module via a signal line 117 corresponding to the rotational output speed of the transmission.

Referring to FIG. 1, the electrohydraulic control device 76 includes second actuator means or a second actuator mechanism 120 for selectively controlling the degree engagement of the input clutch 64 of the torque converter 20. This second actuator means includes a control member or depressible left pedal 122 that is rockable about a transversely oriented pivot pin 124. As the left pedal is depressed from an elevated position to an intermediate position the ability of the input clutch 64 to transmit torque to the pump element 22 from the engine 14 is proportionately reduced. When depressed, the left pedal 122 actuates a rotary sensor 125 and provides a pulse-width-modulated signal to a signal line 126 having a duty factor responsive to the pedal position. Although not illustrated in detail, this position sensor is preferably of the type shown and described in U.S. Pat. No. 4,915,075 issued Apr. 10, 1990 to R. L. Brown. This pulse-width-modulated signal is directed to the electronic control module 78 and is more reliable and less susceptible to electromagnetic interference and wiring harness degradation than other signal forms.

When the left pedal 122 is depressed to a preselected position, braking of the vehicle 12 is initiated through a service brake mechanism identified generally by the reference number 128. This brake mechanism includes a fluid pressure source 130 connected to a pair of independent supply conduits 132 and 134. The supply conduit 132 is connected to a left brake valve 136 having an actuator element, not shown, that is depressible in response to downward movement of the left pedal 122. The brake valve 136 is of the heavy duty type supplied by MICO Incorporated, of North Mankato, Minn., and it provides a fluid output pilot signal proportionate to the amount of pedal depression within the operating range in a pilot conduit 138 shown in broken lines.

The service brake mechanism 128 further includes a centrally located control member or brake pedal 140 that is manually depressible about a transverse pivot pin 142 to actuate a tandem pressure reducing valve 144 with two independent pressure output lines 146 and 148 leading to a rear set of brakes 150 and a front set of brakes 152 respectively. The tandem pressure reducing valve 144 is in fluid communication with the independent supply conduits 132 and 134, as well as the pilot conduit 138 shown in broken lines, and is a form of another brake valve supplied by MICO Incorporated, previously mentioned.

Furthermore, electrohydraulic control device 76 preferably has a right control member or pedal 154 effective when manually depressed about a pivot pin 156 to increase the speed of the vehicle's engine 14. This can be accomplished by a cable 157, as schematically shown, interconnecting the right pedal 154 with a conventional engine governor control 159. Alternatively, the right pedal 154 can be depressed to provide an engine speed-reducing function, since it is immaterial whether the right pedal acts as an accelerator or a decelerator. Although not illustrated, a rotary position sensor could optionally be used similar to the left pedal sensor 125 to produce a pulse-width-modulated electrical signal of the type disclosed in U.S. Pat. No. 4,915,075, mentioned above. That signal could be directed to an engine speed controller, not shown, for controlling the speed of the engine 14.

FIG. 2 shows that the second actuator means 120 for controlling the degree of engagement of converter input clutch 64 includes a solenoid-operated or electromagnetic impeller clutch valve 170 that is connected to the electronic control module 78 by an electrical signal line 172. This valve is hydraulically connected to the first conduit 54 by a branch supply conduit 174, to the reservoir 50 by a branch drain conduit 176, and to the input clutch chamber 70 by a control conduit 178. In general, the impeller clutch valve 170 is a three-way proportional pressure reducing valve that decreases the pressure in control conduit 178 with an increase in the coil current in the signal line 172 leading to a solenoid identified by the reference number 180 in FIGS. 2 and 3. With depression of the left pedal 122 shown in FIG. 1 the force generated by the solenoid urges a plunger or push pin 182 to the right when viewing FIG. 5.

More specifically, the impeller clutch valve 170 has a housing 184 defining a multi-stepped bore 186 adapted to threadably receive a stepped valve body 188. This valve body has three annular grooves 190, 192 and 194 in fluid communication with the supply conduit 174, the drain conduit 176 and the control conduit 178 respectively. A drain passage 196 is connected to a spring chamber 198 defined within the right end of the valve body by an adjustable spring seat 200 threadably connected therewithin. A reaction plunger 202 is reciprocally guided by the spring seat 200, and is continually biased to the left when viewing FIG. 5 by a coiled compression spring 204 acting on a thrust washer 206. A control spool 208 is centered between the left and right plungers 182 and 202 within a central bore 210 in the valve body 188, and has three cylindrical lands 212, 214 and 216 defining a left drain chamber 218 and a right pressure chamber 220 between the lands. A cylindrical first passage 222 connects the annular supply groove 190 with the pressure chamber 220, a cylindrical second passage 224 connects the drain groove 192 with the drain chamber 218 through the passage 196, and a cylindrical third passage 226 connects the central groove 194 to both chambers 218 and 220 with a metering action because the diameter thereof is slightly larger than the width of central spool land 214. A control pressure feedback passage 228 having a flow controlling orifice 230 therein is in fluid communication between the third passage 226 and a left end chamber 231 defined within the valve body 188 and in pressure-biasing communication with the left end of control spool 208.

As is shown in FIGS. 2 and 6, the electrohydraulic control device 76 includes third actuator means or a third actuator mechanism 232 for controllably engaging the lockup clutch 66 at a preselected speed of the converter output shaft 30 to obtain a direct mechanical connection therebetween. The third actuator means 232 includes a solenoid-operated or electromagnetic lockup clutch valve 234 responsive to an electrical signal in a signal line 236 from the electronic control module 78. This valve is in fluid communication with the pressurized first conduit 54 through a branch supply conduit 238, the reservoir 50 through a branch drain conduit 240, and to a control conduit 242. Valve 234 is basically a three-way proportional valve having a solenoid 244 that increases the pressure in the control conduit 242 in direct proportion to the strength of the electrical signal in the line 236. Valve 234 has a housing 246 adapted to receive a stepped valve body 248 having three annular grooves 250, 252 and 254 around the periphery thereof that are continuously connected to the supply conduit 238, the drain conduit 240, and the control conduit 242 respectively. A drain passage 256 in the valve body 248 is connected to a left end chamber 258 immediately around a solenoid-operated plunger 260, and three radially oriented cylindrical passages 262, 264 and 266 are connected between a central bore 267 in the valve body 248 and the respective annular grooves 250, 252 and 254. A control spool 268 is disposed in the central bore 267 in abutment with the plunger 260 and has three cylindrical lands 270, 272 and 274 defining a left pressure chamber 276 and a right drain chamber 278 between the lands. A chamber 280 within the housing 246 at the right end of the valve body 248 is in continuous communication with the pressure in the third passage 266 via a cross passage 281, and another chamber 282 at the right end of the control spool 268 is in fluid communication with the chamber 280 through a damping orifice 283 defined in an end plug 284. Metering in the lockup clutch valve 234 is achieved by the axial displacement of the center land 272 with respect to the slightly larger diameter cylindrical passage 266.

Referring to FIG. 1, the electrohydraulic control device 76 optionally has torque limiting means or a first gear limit control 286 for limiting the torque transmitted by the input clutch 64 when the output speed of the torque converter 20 decreases to a preselected range and when the transmission 32 is solely in first gear. Such torque limiting means preferably includes a manually rotatable control dial 288 connected to a source of electricity 290, and adapted to direct a pulse width modulated electrical signal to the electronic control module 78 via a signal line 292 proportionate to the rotational displacement of that dial.

An optional disabling switch or lockup enable switch 294 is preferably associated with the electronic control module 78 that can allow the vehicle operator to maintain the lockup clutch 66 continuously disengaged when positioned in an OFF position. In the remaining ON position of the switch the third actuator means 232 functions automatically to engage the lockup clutch when the speed of the torque converter output shaft 30 reaches a preselected value. For this purpose the disabling switch 294 is connected to another electrical source 296. Another signal line 298 connects the disabling switch to the electronic control module 78.

As is shown in FIG. 2, the electrohydraulic control device 76 includes pressure responsive means or a pressure responsive apparatus 300 for directing an electrical signal to the electronic control module 78 via a signal line 302 that is proportional to the pressure level in one of the directional clutches 34 and 36. Preferably, the pressure responsive means 300 includes a signal generator 304 connected to a source of electrical energy 306 and to the conduit 63 and generates a pulse width modulated signal in the line 302 having a duty cycle proportionate to the pressure level in either the FORWARD or REVERSE directional clutch 34,36. Alternatively, the signal generator 304 could provide an electrical signal proportionate to the pressure level in one of the speed clutches 38,40,42 and 44 in accordance with the specifics of the design of the transmission 32.

In FIG. 4 the main processing steps of the microprocessor are illustrated which take place during each periodic control loop of the electronic control module 78. In first main step 308 the following seven electrical control inputs are continually read:

1. The electrical signals in the wiring harness 96 from the transmission control handle 82;
   TSHANDLE=Transmission shift handle setting
   0=NEUTRAL
   1=FIRST GEAR
   2=SECOND GEAR
   3=THIRD GEAR
   4=FOURTH GEAR
   POSITIVE=FORWARD
   NEGATIVE=REVERSE 2. The electrical engine speed signal in the signal line 114;
   ENGSPD=Engine speed (rpm)

3. The electrical torque converter output speed signal in the signal line 118 (including the direction of rotation of the output shaft 30);
   TCOSPD=Torque converter output speed and direction (rpm:+=FORWARD,−=REVERSE)

4. The electrical signal in the signal line 302 corresponding to the hydraulic pressure P2 existing in the active one of the directional clutches 34,36;
   TP2PRESS=Trans. directional clutch pressure (Kpa)

5. The electrical signal in the signal line 126 corresponding to the displacement of the left foot pedal 122 by the vehicle operator;
   LPPOS=Left foot pedal position (degrees)

6. The electrical signal in the signal line 298 from the lockup enable switch 294;
   LESW=Lockup enable switch setting (0=OFF, 1=ON)
   and 7. The electrical signal in the signal line 292 from the first gear rimpull limit control 286.
   RPLPOS=Rimpull limit dial position (degrees)

The second main step 310 is to determine the existing commands to the transmission solenoid valves 100, 102, 104, 106, 108 and 110. The microprocessor sets the transmission solenoid command CYSOLCMD) which indicates which solenoids are to be energized to engage the transmission direction and gear ratio indicated by the transmission control handle 82, such as is indicated by the following chart:

| TSOLCMD = Trans. sol. command (6 bit binary no.) | |
|---|---|
| BIT 0 = sol. 100 command (0 = OFF, 1 = ON) | F |
| BIT 1 = sol. 102 command (0 = OFF, 1 = ON) | R |
| BIT 2 = sol. 104 command (0 = OFF, 1 = ON) | 1 |
| BIT 3 = sol. 106 command (0 = OFF, 1 = ON) | 2 |
| BIT 4 = sol. 108 command (0 = OFF, 1 = ON) | 3 |
| BIT 5 = sol. 110 command (0 = OFF, 1 = ON) | 4 |

The third main step 312 is to determine the required command for the lockup clutch valve 234 as is indicated by the middle block in FIG. 4. LCSOLCMD=Lockup clutch solenoid command (amps)

The third main step 312 is delineated by the subroutine or logic subchart illustrated in FIGS. 7 and 8. At substep 314 the electronic control module 78 determines whether the manually operated disabling switch 294 is in the OFF position, indicating that the operator wants to maintain the torque converter 20 solely in a hydrodynamic working mode, or in the ON position indicating that the operator wants the control module to automatically engage the lockup clutch 66 under preselected circumstances. If the disabling switch 294 is OFF, the microprocessor will proceed to disengage the lockup clutch 66 as will be later described. If the disabling switch 294 is ON, the microprocessor proceeds to substep 320. Substep 320 determines whether or not the left foot pedal 122 is released from depression by the vehicle operator. If the left pedal 122 is not released, or is depressed, the microprocessor will proceed to substep 322 (FIG. 8). If the pedal 122 is released, or not depressed, the microprocessor will proceed to a decision-making substep 326. Substep 326 determines whether the transmission 32 has been in the same gear for a preselected period of time, e.g. for 1.0 seconds. If not, the microprocessor will proceed to substep 322. If the transmission has been in the same gear for more than that selected time period then the microprocessor will proceed to a substep 332. Substep 332 identifies whether it has been more than a preselected period of time, for example 4.2 seconds, since the lockup clutch 66 was last engaged. If not, the microprocessor proceeds to substep 322. If YES, the microprocessor proceeds to a decision-making substep 338.

Substep 338 establishes if the torque converter output shaft speed (TCOSPD) is within a preselected speed range; for example, above 1565 rpm and below a maximum speed of 2250 rpm. If not, the microprocessor proceeds to a substep 340. Substep 340 determines the lockup adjusted torque converter output speed (LUADJTCOSPD), which is the torque converter output speed (TCOSPD) adjusted by a factor related to the deceleration rate of the torque converter output shaft 30, or specifically [K (TCOSPD-OLDTCOSPD)].

LUADJTCOSPD=Lockup adjusted torque converter output speed (rpm), and wherein

OLDTCOSPD=Torque converter output speed from the last control loop-approximately 0.015 seconds earlier (rpm)

On the other hand, if the speed is within the range set forth in substep 338, the microprocessor will proceed to engage the lockup clutch 66 in accordance with a substep 341 (FIG. 8) as will be described later.

From the information obtained in substep 340 a subsequent substep 342 determines whether the adjusted speed of the converter output shaft 30 is above a preselected "HOLD" value; for example, 1415 rpm. This value is somewhat less than the value required to initiate engagement of the lockup clutch 66. If not, the microprocessor proceeds to substep 322 of FIG. 6B so that the lockup clutch 66 is disengaged. If yes, the microprocessor proceeds to a substep 350. The substep 350 determines whether or not the lockup clutch 66 is currently engaged by checking the value of LCENGCMD as set in the last loop.

LCENGCMD=Lockup clutch engage command (0=disengage, 1=engage)

If not, the microprocessor proceeds to substep 322 to disengage the lockup clutch 66. If yes, the microprocessor proceeds to substep 341 to engage that clutch.

Beginning at substep 322, as directed above, the microprocessor sets LCENGCMD to zero, indicating the disengage command. In subsequent substep 352 LCSOLCMD is set as a function of time since the transition of LCENGCMD from one to zero, and a predetermined table, in order to controllably modulate the gradual release of the lockup clutch 66. Such modulation is a controlled rate of pressure release from the chamber 74 shown in FIG. 1B, and can be referred to as a "ramp down" controlled pressure release function. Such "ramp down" is preferably accomplished in only a fraction of a second; for example, 0.1 seconds.

Beginning at substep 341, as directed above, the microprocessor sets LCENGCMD to one, indicating the engage command. In subsequent substep 354 LCSOLCMD is set as a function of time since the transition of LCENGCMD from zero to one, and a predetermined table, in order to controllably modulate the gradual engagement of the lockup clutch 66. Such modulation is at a controlled rate of pressure increase to the chamber 74, and can be referred to as a "ramp up" or graduated pressure increase function. Preferably, this "ramp up" is accomplished in approximately 0.7 seconds.

Returning now to the main routine flow chart of FIG. 5, it may be noted to include a fourth main step 356 that determines the solenoid operating command for the controlled engagement of the impeller input clutch 64 shown in FIG. 1B.

ICSOLCMD=Impeller clutch solenoid command (amps)

Figure 10:
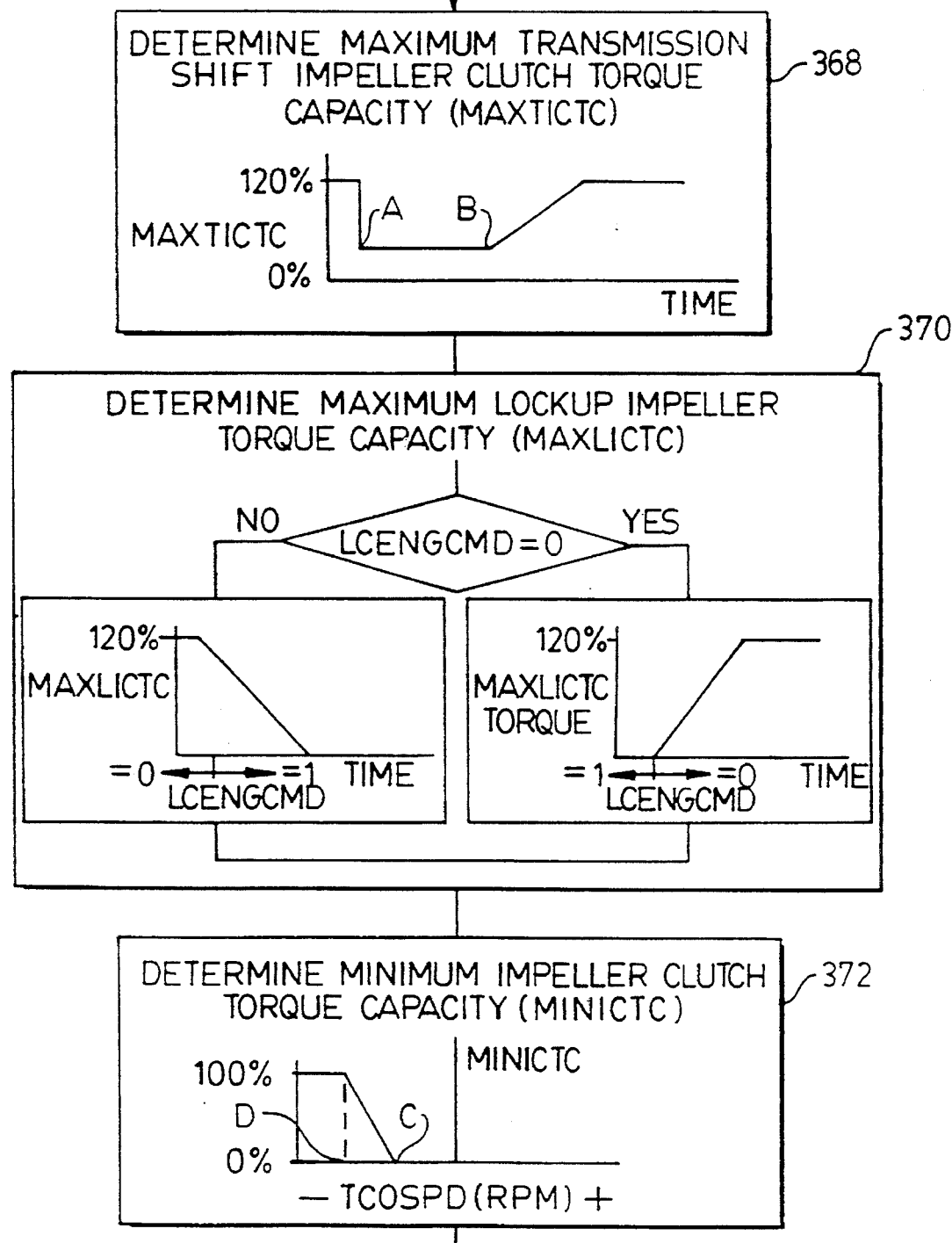
Figure 11:
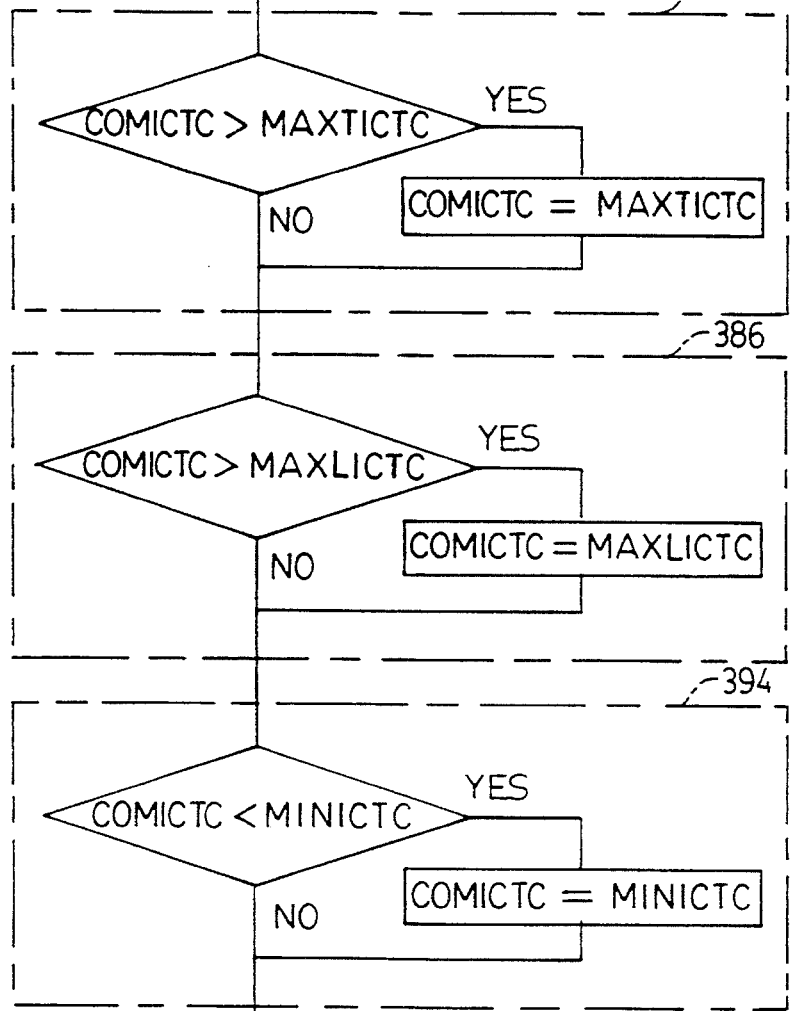

The subsidiary processing steps for such clutch engagement are more specifically illustrated by the serially related subroutine flow charts shown in FIGS. 9, 10, and 11. Overall, the flow charts of FIGS. 9 and 10 produce the following six variables that are subsequently used in the flow chart of FIG. 11 to compute ICSOLCMD:

ICTCPR=Impeller clutch torque capacity pedal ratio (% of maximum)

ICTCTLR=Impeller clutch torque capacity torque limit ratio (% of maximum)

MAXRICTC=Maximum rimpull impeller clutch torque capacity (% of impeller torque at full throttle converter stall)

MAXICTC=Maximum transmission shift impeller clutch torque capacity (% of impeller torque at full throttle converter stall)

MAXLICTC=Maximum lockup impeller clutch torque capacity (% of impeller torque at full throttle converter stall)

MINICTC=Minimum impeller clutch torque capacity (% of impeller torque at full throttle converter stall)

In the initial substep 358 of FIG. 9 the microprocessor determines the impeller clutch torque capacity pedal ratio (ICTCPR) from the position of left pedal 122 in FIG. 1 (LPPOS) according to a predetermined table as is illustrated. The second substep 360 determines the impeller clutch torque capacity limit ratio (ICTCTLR) from the position of the rimpull limit control dial 288 in FIG. 1 (RPLPOS) according to another predetermined table as is shown.

In addition to the two manual inputs associated with substeps 358 and 360, the present invention utilizes four automatic inputs. The third substep 362 is the first one of the automatic inputs and determines the maximum rimpull impeller clutch torque capacity (MAXRICTC). If the transmission is not in first gear, as is indicated by the position of the actuating element 86 of the control handle 82 of FIG. 1 (and the TSHANDLE value), then MAXRICTC is set to 100%. If the transmission is in first gear, then as indicated by subroutine 364 an adjusted torque converter output speed is calculated.

TLADJTCOSPD=Adjusted torque converter output speed (rpm)

TLADJTCOSPD is the speed of the torque converter output shaft 30 (TCOSPD) adjusted by a factor related to the deceleration rate of the torque converter output shaft. In a subsequent subroutine 366 the microprocessor determines MAXRICTC as a function of the adjusted torque converter output speed according to another predetermined table as is shown.

The microprocessor of the electronic control module 78 proceeds to fourth substep 368 shown at the top of FIG. 10, which is the second one of the automatic inputs, and determines the maximum transmission shift impeller clutch torque capacity (MAXTICTC). When a shift in gears is indicated by a change in TSHANDLE, the substep 368 will cause MAXTICTC to be set to a preselected relatively low level.

In one embodiment, when the pressure rises in the conduit 63 in FIG. 2 (TP2PRESS) above a preselected value (POINT B), indicating that the engagement of one of the directional clutches 34 or 36 of the transmission 32 has begun, MAXTICTC will be adjusted upward at a controlled rate until it reaches 120%. In another embodiment, modulation of MAXTICTC will begin when the transmission clutch relative speed is approximately zero. Transmission clutch relative speed is a factor determined by comparing transmission output speed and torque converter output speed.

In fifth substep 370 of FIG. 10, involving the third automatic input, the microprocessor determines the maximum lockup impeller torque capacity (MAXLICTC) according to the value of the lockup clutch engagement command (LCENGCMD). If the lockup clutch 66 is being engaged, as indicated by a transition value of LCENGCMD from zero to one, the microprocessor decreases MAXLICTC or "ramps it downwardly" according to a preselected function of time since LCENGCMD changed. This normally means that the input clutch 64 is gradually disengaged or "ramped down" in pressure in approximately 0.7 seconds for a smooth transition. If the lockup clutch is being disengaged, MAXLICTC is increased or "ramped upwardly" as a function of time since the LCENGCMD changed from one to zero. This normally means that the input clutch 64 is gradually fully engaged in about 0.7 seconds.

The microprocessor proceeds to substep 372 in FIG. 10, involving the fourth automatic input, to determine minimum impeller clutch torque capacity (MINICTC). The value of MINICTC is set as a function of torque converter output speed (TCOSPD) to cause the minimum impeller clutch torque capacity to increase above zero as TCOSPD reaches a preselected negative speed value and continues to increase in the negative direction, indicating the transmission output shaft 30 is rotating in a direction opposite that of the engine shaft 16 shown in FIG. 2.

All of the impeller clutch control variables described above are used in the logic flow chart of FIG. 11 to determine the combined impeller clutch torque capacity (COMICTC).

COMICTC=Combined impeller clutch torque capacity (% of impeller torque at full throttle converter stall)

As is indicated by seventh substep 374 the microprocessor first sets COMICTC equal to the product of the impeller clutch torque capacity pedal ratio (ICTCPR) times the impeller clutch torque capacity torque limit ratio (ICTCTLR) times the maximum rimpull impeller clutch torque converter capacity (MAXRICTC). This is the basic capacity as adjusted by the vehicle operator.

In the eighth substep 376 of FIG. 11 the microprocessor determines if the value of COMICTC exceeds the value of the maximum transmission shift impeller torque capacity (MAXTICTC) calculated in substep 368. If yes, then COMICTC is set to the value of MAXTICTC. If no, the COMICTC is left unchanged. Thus substep 376 has the effect of limiting COMICTC to be equal to or below the value MAXTICTC.

In the same way ninth substep 386 limits COMICTC to be less than or equal to the maximum lockup impeller torque capacity (MAXLICTC) calculated in substep 370, and tenth substep 394 limits COMICTC to be greater than or equal to the minimum impeller clutch torque capacity (MINICTC) calculated in substep 372.

The microprocessor proceeds to eleventh substep 396 of FIG. 11 to determine the impeller clutch solenoid command (ICSOLCMD) as a function of the final value of COMICTC according to a predetermined table as is illustrated within the drawing box. The impeller clutch solenoid command determines the electrical current that will be supplied to the electromagnetic impeller clutch valve 170 by the electronic control module 78 driver circuitry. The relationship between ICSOLCMD and COMICTC is established by the pressure-current relationship provided by the impeller clutch valve 170, the pressurized area of the input clutch piston 68, and the area and friction coefficient of the discs of the impeller clutch 64.

As is indicated in FIG. 6, a fifth and last main step 398 is accomplished by the microprocessor that sends out the required solenoid commands through the driver circuitry of the electronic control module 78 to the transmission solenoids 1130, 102, 104, 106, 108 and 110, the lockup clutch solenoid 244, and the impeller clutch solenoid 180.

INDUSTRIAL APPLICABILITY

In operation, this embodiment provides the vehicle operator direct control of the transmission 32 by the direction setting and gear ratio setting control handle 82. The manipulation of the actuating element 90 and the displacement of the gear ratio actuating element 86 is converted to electrical signals which are directed to the electronic control module 78 by the wiring harness 96 shown in FIG. 1. The electronic control module then energizes the correct ones of the transmission solenoids 100, 102, 104, 106, 108, and 110 shown in FIG. 2 via the wiring harness 98 to cause the transmission to shift according to the operator's demand.

The operator can choose to enable or disable automatic engagement of the lockup clutch 66 by setting the disabling switch 294 shown in FIG. 1. If the disabling switch is positioned in OFF, indicating the operator wants the drive train 10 to function solely in a hydrodynamic working mode, then the electronic control module 78 disengages the lockup clutch 66 by continuing to execute substeps 322 and 352 of FIG. 8 and causing no current to be passed through the lockup clutch solenoid 244 shown in FIGS. 2 and 4. This causes the lockup clutch valve 234 to drop the pressure in the control conduit 242 leading to the lockup clutch actuating chamber 74. This is achieved by the retraction of the left plunger 260 shown in FIG. 4, whereupon the control spool 268 is urged to the left by the pressure in the third passage 266, cross passage 281, right end chamber 280 and the chamber 282 connected thereto via the orifice 283. The control conduit 242 and the third passage 266 are subsequently placed into more open communication with the drain conduit 240 through the drain chamber 278 and second passage 264, and pressure is substantially fully relieved from right end chamber 280. Simultaneously, the center land 272 of the control spool 268 substantially blocks fluid communication between the pressurized chamber 276 and the third passage 266.

If the disabling switch 294 is ON, then control logic substeps 320, 326, 332, 338, 340, 342 and 350 of FIG. 7 determine if conditions are correct for automatic engagement of the lockup clutch 66. The conditions that must be met are that the left foot pedal 122 of FIG. 1 is released (substep 320), that the transmission 32 has been in the same gear for some predetermined period of time (substep 326), that the lockup clutch 66 has been disengaged for a predetermined length of time (substep 332), that the speed of the output shaft 30 of the torque converter 20 is within a preselected range (TCOSPD of substep 338), and that the adjusted torque converter output speed (LUADJTCOSPD) stays above a preselected value (substeps 340, 342 and 350). When engagement of the lockup clutch 66 is called for, substeps 341 and 354 of FIG. 8 are executed to cause current flow through the lockup solenoid 244 of FIG. 4 in such a manner that the lockup clutch valve 234 "ramps up" and then holds a relatively high pressure level in conduit 242 sufficient to engage the lockup clutch 66. This is achieved by the high current signal being directed to the signal line 236 in FIG. 2 so as to actuate the solenoid 244 and urge the left plunger 260 to the right when viewing the drawing. This causes the control spool 268 to move to the right to the position illustrated, whereupon the pressurized chamber 276 is in more open communication with the third passage 266, the control conduit 242, and the chamber 74 behind the actuating piston 72. This substantially fully pressurizes and engages the lockup clutch 66.

The operator can directly control the action of the impeller clutch 64, subject to the automatic functions described below, by moving the left foot pedal 122 shown in FIG. 1. The rotary position sensor 125 provides a signal representing the position of the pedal to the electronic control module 78 via the signal line 126. Within the electronic control module the pedal position (LPPOS) is read, as in substep 358 of FIG. 8, and is used in the calculation of the combined impeller clutch torque capacity (COMICTC) as indicated by FIGS. 9, 10 and 11. The current to the impeller clutch solenoid 180 is set according to COMICTC, and the resulting impeller clutch actuating pressure directed to the control conduit 178 by the impeller clutch valve 170, and the resulting torque capacity of the input clutch 64 varies with the elevation or position of the foot pedal 122 as is shown in FIG. 4. With depression of the left foot pedal the rotary position sensor 125 produces a pulse width modulated signal to a conventional driver circuit, not shown, in the electronic control module 78. More particularly, as the left foot pedal is manually depressed from a fully elevated 45° angle first position to an intermediate 33° angle second position the electronic control module adjusts impeller clutch solenoid current proportionately, increasing it to a preselected level. This signal is subsequently effective to proportionately reduce the control pressure in the control conduit 178 leading to impeller input clutch 64 to a preselected relatively lower pressure value. This reduces the torque transmitting capability of the input clutch 64 as is also shown in FIG. 4. Further depression of the left foot pedal 122 so that it is within the remaining 33° to 25° range results, in the instant embodiment, in no further reduction in the pressure that extends the actuating piston 68 to the left against the interleaved plates and discs of input clutch 64 shown in FIG. 2. This is very significant feature in that the fluid pressure existing in the toroidal circuit of the torque converter 20 tends to retract the actuating piston 68 to the right when viewing FIG. 2, and such internal pressure varies over a substantial range due to the widely varying operating conditions of the vehicle 12. By holding 25 psi (170 kPa), for example, in the input clutch chamber 70 the fill and reaction time is shortened for any subsequent repressurization.

When the left foot pedal 122 is depressed the required pedal effort increases at a relatively low rate until the 33° position is obtained as is shown by a solid line in FIG. 4. During this range of movement the impeller clutch pressure is reduced from a maximum 100% value to a minimal level of approximately 5 to 10% of that maximum value as is shown by a phantom line; for example, the minimum pressure level could be about 25 psi (170 kPa). Simultaneously, the torque transmitting capability of the input clutch 64 is proportionately reduced as is shown by the broken line.

FIG. 5 further illustrates that after the left foot pedal 122 is depressed beyond the 33° second position the left brake valve 136 progressively directs an increasing pilot signal via the conduit 138 to the tandem pressure reducing valve 144. The pilot signal pressure increases directly with the further depression of the foot pedal as is indicated by the dotted line in FIG. 5. This results in the tandem pressure reducing valve communicating the supply conduit 132 with line 146 to the rear set of service brakes 150, and independently the supply conduit 134 to the line 148 to the front set of service brakes 152. If the operator alternatively depresses the central brake pedal 140, the same independent actuation of the rear and front set of service brakes would be assured in a conventional manner without any interaction with the impeller clutch 64.

The vehicle operator can also adjust the action of the impeller clutch 64 by setting the control dial 288 shown in FIG. 1, which in effect will alter the value LPOS read by the electronic control module 78 in substep 358 of FIG. 9. Through the action of substeps 360, 362, 374 and 396 in FIGS. 9 and 11 current supplied to the solenoid 180 of the impeller clutch valve 170 is adjusted so as to reduce the clutch actuating pressure in chamber 70 and the clutch torque that will be achieved at relatively low speed values of the torque converter output shaft 30 and at any given position of the left foot pedal 122. When the dial 288 is disposed in a fully clockwise position there is a preselected minimal amount of pressure reduction to the impeller clutch valve or maximum torque transmission. Moving the dial 288 fully counterclockwise causes a maximum reduction in the impeller clutch pressure and minimal torque transmission through the drive train 10. This feature will allow the operator to adjust impeller clutch torque capacity to match vehicle operating conditions.

The first automatic function of the electronic control module 78 is provided within the substep 362 of FIG. 9 which initially determines whether or not the transmission 32 is engaged in first gear. If it is, then subroutine 364 calculates TLADJTCOSPD which recognizes changes in the speed of torque converter output shaft 30. In order to better appreciate the advantages of this desirable feature, it can be visualized that the vehicle 12 is a wheel loader equipped with a loader bucket and that the wheel loader has been driven forwardly into a pile of din. This is a typical mode of operation, and if the impeller clutch 64 is allowed to remain fully engaged then an excessive amount of torque is delivered to the wheels of the vehicle, not shown, via the hydrodynamic circuit of the torque converter 20, the output shaft 30 and the transmission 32. In order to automatically anticipate this eventuality, the rate of deceleration of the output shaft 30 is monitored by subroutine 364. When the loader bucket, also not shown, penetrates the dirt pile the forward motion of the wheel loader is drastically reduced and the rate of deceleration of the output shaft 30 is immediately recognized. This deceleration rate is reflected in TLADJTCOSPD that is directed to subroutine 366. As the graph within subroutine 366 indicates, at low values of the ADJUSTED torque converter output speed the amount of torque transmitting capability of the input clutch 64 is reduced. At low values of TLADJTCOSPD subroutine 364 promptly reduces the electrical signal in the line 172 to the impeller clutch valve 170 causing the automatic reduction of the pressure supplied to the actuating chamber 70 and the reduction of torque delivered through the input clutch 64. This decreases the amount of wear of the vehicle's tires, and also allows the speed of the engine 14 to be maintained at a reasonably high level so that the vehicle's auxiliary equipment such as the loader bucket's hydraulic system can respond to new commands at a relatively fast rate. In this regard, rotating the control dial 288 of FIG. 1 in a counterclockwise direction has the effect of displacing the inclined solid line identified by the letter E to the position of broken line F in the graph of subroutine 366 in first gear. In this way the operator can tailor the automatic reduction of impeller clutch torque to the vehicle operating conditions or the ground conditions.

A second automatic function is provided by substep 368 at the top of FIG. 10. The diagram shown in FIG. 12 illustrates the transient pressure changes in the forward directional clutch 34 and the reverse directional clutch 36 shown in FIG. 2, the changes in pressure P2 in the conduit 63, and the changes in pressure in the impeller clutch actuating chamber 70 resulting in a typical shift from forward to reverse as made by the operator's manipulation of the control handle 82 shown in FIG. 1. When the actuating element 90 is rocked from FORWARD to REVERSE the electronic control module 78 turns off the forward solenoid 100 causing the pressure to drop in forward clutch 34, and turns on the reverse solenoid 102 causing the reverse clutch 36 to fill and then begin to pressurize as is shown by point C on the middle drawing of FIG. 12. During this same time frame, which is approximately 0.4 seconds, the pressure P2 initially drops and then begins to rise. When a shift is called for, such as indicated at broken vertical line A—A in FIG. 12, MAXTICTC drops as is indicated by reference letter A in substep 368 of FIG. 10 and this causes the pressure to impeller clutch actuating chamber 70 to drop quickly to some relatively low value, for example approximately 25 to 50 psi (170 to 345 kPa). At broken vertical line B—B in FIG. 12 the value of MAXTICTC of substep 368 begins to rise at reference letter B. This causes impeller clutch pressure to rise in a modulated manner as is indicated at point B in the lower graph of FIG. 12 to full engagement and the pressure level before the shift. This automatic function reduces the energy absorbed by the reverse transmission clutch 36 during this shift by reducing the torque it transmits while slipping.

In the preferred embodiment modulation of the impeller clutch pressure after a directional shift is triggered when a transmission clutch relative speed reaches approximately zero.

In one embodiment, the transmission clutch relative speed is determined through a comparison of the transmission output speed and the torque converter output speed. The difference between the torque converter output speed and the transmission output speed (multiplied by the current gear ratio) is defined as the transmission clutch relative speed.

In the preferred embodiment, the time at which transmission clutch relative speed is approximately zero is predicted by determining the slope of the change in clutch relative speed. The clutch relative speeds are sampled every $\Delta t$, for example, 15 ms. Using the determined slope, the clutch relative speed is linearly projected to zero. If the clutch relative speed reaches zero within $n \cdot \Delta t$ seconds then clutch relative speed is approximately zero and clutch modulation is begun. The constant n is a predetermined number of time periods, for example 3, and is experimentally determined as the time delay between a clutch command and clutch response.

As shown in the bottom two graphs of FIG. 12, during engagement of the input clutch, clutch pressure may be quickly linearly ramped to a control level or as in the bottom graph, quickly ramped to a first control level at a first rate. The clutch pressure is then held at a constant pressure for a predetermined time and subsequently, raised to a second control level at a second rate.

A third automatic function is provided by substep 370 of FIG. 10 in which the impeller clutch 64 is caused to disengage when the lockup clutch 66 is engaged as indicated by LCENGCMD computed in substeps 341 and 354 of FIG. 8. When the lockup clutch 66 is engaged, substep 370 of FIG. 10 causes MAXLICTC to be gradually reduced to zero, which in turn causes the current to impeller clutch solenoid 180 to increase through substep 396 of FIG. 11 and the action of the electronic control module 78. The pressure in the actuating chamber 70 is subsequently caused to "ramp down" and to controllably disengage the impeller clutch 64. This automatic function minimizes fluid losses within the torque converter 20 by allowing the impeller element 22 to freewheel. Conversely, the pressure to the impeller clutch 64 is automatically "ramped upwardly" to engage it when the lockup clutch 66 is disengaged.

The fourth automatic function is provided by substep 372 of FIG. 10 which determines a minimum impeller clutch torque capacity (MINICTC) as a function of the negative speed value of the torque converter output shaft 30. By the term "negative speed value" it is meant that the direction of rotation of the output shaft 30 is opposite that of the normal direction of rotation of the engine shaft 16 as may be appreciated by reference to FIG. 2. When the negative speed value reaches a preselected level, for example 400 rpm as is indicated at point C in the graph of substep 372, then the amount of torque transmitted by the input clutch 64 is automatically increased by the electronic control module 78 as the negative speed value increases as can be noted by reference to the graph. At negative 1600 rpm, point D on the graph, the output signal is modified to produce maximum engagement of the impeller input clutch 64. In operation, for example, if the vehicle is rolling backwards down a steep slope while in a forward gear with the weight of the vehicle driving the converter output shaft 30 in a progressively increasing speed in the negative direction, it becomes increasingly less desirable to reengage the input clutch 64 because the rotating housing 18 is being driven in one direction and the turbine element 28 is being driven in the opposite direction and excessive amounts of energy would have to be absorbed by the input clutch. By automatically progressively engaging the input clutch under these circumstances an increasing portion of the energy being transmitted by the vehicle's weight can be directed back to the engine 14 to retard the acceleration rate and reduce the heat energy absorbed by the input clutch.

Accordingly, it can be appreciated that the electrohydraulic control device 76 of the present invention is simple and easy to operate, and is effective to improve the overall productivity of the vehicle and to reduce fuel consumption. This is due to the continuously modulatable action of the left foot pedal 122 and its precise control of the engagement level of the input clutch 64 through the programmable electronic control module 78 and the solenoid operated valve 170, and to the logic routines contained in the module and discussed above in connection with FIGS. 9, 10 and 11. Through the direct operator control of the engagement level of the input clutch engagement power can be better divided between the wheels of the vehicle and the auxiliary equipment such as the implement system, not shown, which is driven by the engine 14 upstream of the controllably slippable input clutch 64. Moreover, a "soft" shift is automatically accomplished due to the disengagement of the input clutch during transmission gear ratio or directional shifts. And furthermore, the electronic control module 78 features a logic system that minimizes engine lug during low speed operating conditions of the output shaft 30 of the torque converter 20, that controllably engages the input clutch under certain conditions of fast reverse rotation of the output shaft 30, that disengages the input clutch when the output shaft 30 decelerates too rapidly, and that is compatible with a lockup clutch for effectively bypassing the torque converter and providing an efficient direct drive mode of operation under preselected operating conditions. And still further, the electrohydraulic control device 76 effectively cooperates with the electrical control handle 82 for operating the transmission 32, and the service brake mechanism 128 for braking the vehicle 12 after bringing the input clutch 64 to a substantially disengaged condition by operating the left foot pedal 122, or alternatively by braking the vehicle with an engaged input clutch by operating the central foot pedal 140.

Other aspects, objects, and features of the present invention can be obtained from a study of the drawings, the disclosure, and the appended claims.

We claim:
1. An electrohydraulic control device for a drive train of a vehicle including an engine, a transmission, a source of pressurized fluid, and an input clutch drivingly connected between the engine and the transmission, comprising:

actuator means including a control member manually movable between first and second positions, wherein the transmission is adapted to responsively shift between a FORWARD and a REVERSE gear ratio in response to movement of said control member from said first position to said second position;

means for sensing a rotational output speed of the transmission and responsively producing a transmission output speed signal;

means for sensing the a rotational input speed of the transmission and responsively producing a transmission input speed signal;

valve means for directing fluid under pressure from the source to the input clutch to controllably engage and disengage the input clutch;

controlling means for, in response to movement of said control member from said first position to said second position, disengaging the input clutch, receiving said transmission output speed signal and said transmission input speed signal, responsively determining a transmission clutch relative speed, and for actuating said valve means to controllably engage the input clutch as a function of the transmission clutch relative speed.

2. An electrohydraulic control device, as set forth in claim 1, wherein said transmission clutch relative speed is determined as the difference between said transmission input speed signal and said transmission output speed signal multiplied by a current gear ratio.

3. An electrohydraulic control device, as set forth in claim 1, wherein said electronic control module is adapted to controllably engage the input clutch in response to said transmission clutch relative speed being substantially zero.

4. An electrohydraulic control device, as set forth in claim 3, wherein said electronic control module is adapted to determine the change in said the transmission clutch relative speed and responsibly determine if said transmission clutch relative speed will be equal to zero within a predetermined period of time.

5. An electrohydraulic control device, as set forth in claim 1, wherein said valve means is adapted to linearly modulate input clutch pressure during engagement of the input clutch.

6. An electrohydraulic control device, as set forth in claim 1, wherein during engagement of the input clutch, said valve means is adapted to linearly modulate input clutch pressure at a first rate to a first control level and to a second control level at a second rate.

7. An electrohydraulic control device, as set forth in claim 6, wherein said valve means is adapted to hold said input clutch pressure at a constant pressure for a predetermined time period between modulation at said first rate and modulation at said second rate.

8. An electrohydraulic control device, as set forth in claim 1, wherein the drive train includes a torque converter connected between the input clutch and the transmission and having an output member.

9. An electrohydraulic control device, as set forth in claim 1, wherein said transmission input speed sensing means measures a torque converter output speed.

10. An electrohydraulic control device, as set forth in claim 1, wherein the drive train includes a torque converter connected between the input clutch and the transmission and having a rotating housing, an impeller element connected to the rotating housing through the input clutch, a reactor element, a turbine element connected to the rotating housing through a lockup clutch, and including another valve means for directing fluid under pressure from the source to the lockup clutch.

11. An electrohydraulic control device for a drive train of a vehicle including an engine, a transmission, a source of pressurized fluid, a torque converter connected between the input clutch and the transmission and having a rotating housing, an impeller element connected to the rotating housing through the input clutch, a reactor element, a turbine element connected between the rotating housing and the turbine element, and an input clutch drivingly connected between the engine and the transmission, comprising:

actuator means including a control member manually movable between first and second positions, wherein the transmission is adapted to responsively shift between a FORWARD and a REVERSE gear ratio in response to movement of said control member from said first position to said second position;

a lockup clutch connected between the rotating housing and the turbine element of the torque converter;

means for sensing a rotational output speed of the transmission and responsively producing a transmission output speed signal;

means for sensing a rotational input speed of the transmission and responsively producing a transmission input speed signal;

valve means for directing fluid under pressure from the source to the input clutch to controllably engage and disengage the input clutch; and controlling means for, in response to movement of said control member from said first position to said second position, disengaging the input clutch, receiving said transmission output speed signal and said transmission input speed signal responsively determining a transmission clutch relative speed, and for actuating said valve means to controllably engage the input clutch as a function of the transmission clutch relative speed.

12. An electrohydraulic control device, as set forth in claim 11, wherein said transmission clutch relative speed is determined as the difference between said transmission input speed signal and said transmission output speed signal multiplied by a current gear ratio.

13. An electrohydraulic control device, as set forth in claim 11, wherein said electronic control module is adapted to controllably engage the input clutch in response to said transmission clutch relative speed being substantially zero.

14. An electrohydraulic control device, as set forth in claim 13, wherein said electronic control module is adapted to determine the change in said the transmission clutch relative speed and responsively determine if said transmission clutch relative speed will be equal to zero within a predetermined period of time.

15. An electrohydraulic control device, as set forth in claim 11, wherein said valve means is adapted to linearly modulate input clutch pressure during engagement of the input clutch.

16. An electrohydraulic control device, as set forth in claim 11, wherein during engagement of the input clutch, said valve means is adapted to linearly modulate input clutch pressure at a first rate to a first control level and to a second control level at a second rate.

17. An electrohydraulic control device, as set forth in claim 16, wherein said valve means is adapted to hold said input clutch pressure at a constant pressure for a predetermined time period between modulation at said first rate and modulation at said second rate.

* * * * *

UNITED STATES PATENT AND TRADEMARK OFFICE
CERTIFICATE OF CORRECTION

PATENT NO. : 5,456,333
DATED : October 10, 1995
INVENTOR(S) : Brandt et al

It is certified that error appears in the above-identified patent and that said Letters Patent is hereby corrected as shown below:

```
In column 7, line 63, change "3" to "5"
In column 11, line 16, change "68" to "8"
In column 11, line 33, change "1B" to "2"
In column 11, line 51, change "1B" to "2"
In column 13, line 53, change "6" to "4"
In column 14, line 14, change "4" to "6"
In column 14, line 18, change "4" to "6"
In column 14, line 45, change "4" to "6"
In column 15, line 6,  change "4" to "3"
In column 15, line 18, change "4" to "3"
In column 15, line 34, change "4" to "3"
In column 15, line 42, change "5" to "3"
In column 15, line 48, change "5" to "3"
```

Signed and Sealed this

Fourth Day of March, 1997

Attest:

BRUCE LEHMAN

*Attesting Officer*     Commissioner of Patents and Trademarks